United States Patent [19]

Seidl

[11] Patent Number: 4,560,185
[45] Date of Patent: Dec. 24, 1985

[54] RIDER EJECTOR ARRANGEMENT FOR A SINGLE TRACK VEHICLE, SUCH AS A MOTORCYCLE

[75] Inventor: Josef Seidl, Germering, Fed. Rep. of Germany

[73] Assignee: Bayerische Motoren Werke AG, Fed. Rep. of Germany

[21] Appl. No.: 557,482

[22] Filed: Dec. 2, 1983

[30] Foreign Application Priority Data

Dec. 4, 1982 [DE] Fed. Rep. of Germany ....... 3244967

[51] Int. Cl.⁴ .............................................. B62J 27/00
[52] U.S. Cl. .................................... 280/748; 180/219; 280/751
[58] Field of Search ....................... 280/748, 751, 752; 180/219

[56] References Cited

U.S. PATENT DOCUMENTS 3,486,767 12/1969 Lujan .................................. 280/751
4,427,214 1/1984 Haggkvist .......................... 280/752

FOREIGN PATENT DOCUMENTS 3126741 4/1982 Fed. Rep. of Germany .
2003096 3/1979 United Kingdom ................ 280/751

OTHER PUBLICATIONS

*Automotive Engineering*, pp. 82–83, Sep. 1979.

Primary Examiner—Joseph F. Peters, Jr.
Assistant Examiner—Kenneth R. Rice
Attorney, Agent, or Firm—Craig and Burns

[57] ABSTRACT

A safety installation for single track vehicles, especially motorcycles, which enables the driver of the motorcycle to be thrown over an obstacle, particularly in case of lateral impact against a passenger motor vehicle; a support element with a deflection surface is provided for that purpose ahead of the driver; the support element, which can be constructed as tank-mounted carrier, is rotatably supported to the motorcycle frame about an axis of rotation which extends as a cross axis which is disposed ahead of and below the deflection surface.

20 Claims, 5 Drawing Figures

RIDER EJECTOR ARRANGEMENT FOR A SINGLE TRACK VEHICLE, SUCH AS A MOTORCYCLE

The present invention relates to an ejector arrangement for a single track vehicle, such as a motorcycle, having a seat and a deflection surface arranged generally ahead of the upper body of the driver which accelerates the driver upwardly during a deceleration caused by an accident.

Accident investigations have shown that in those accidents, during which the motorcycle impinges laterally on a passenger motor vehicle, the injury risk for the driver of the motorcycle is greatest if he impinges with the head against the roof edge of the passenger motor vehicle. However, if he flies over the vehicle, then as a rule the injuries are lesser. It has therefore been proposed, inter alia, to impart to the fuel tank a rising shape. As a result thereof, its top side acts as a deflection surface which, during an accident, accelerates the motorcycle driver upwardly as on a ramp into a flight path that leads over the vehicle.

However, it is not always possible to provide such a rising tank shape. Furthermore, with a tank constructed in such a manner, the aimed-at effect can be nullified if a tank-mounted carrier, such as a so-called tank knapsack, is arranged on the fuel tank. In those cases, the driver impinges on the carrier without being accelerated upwardly.

This is where the present invention starts. It has as its task to assure, above all in case of a lateral impact of a motorcycle against a passenger motor vehicle, that the driver of the motorcycle flies over the passenger motor vehicle even when a tank-mounted carrier is arranged on the fuel tank or the tank shape has no rising deflection surface.

The underlying problems are solved according to the present invention in that the deflection surface is formed on a formrigid support element which is pivotal with respect to the motorcycle frame about a cross axis provided below and ahead of the deflection surface.

As a result of its pivotal connection at the motorcycle frame, the support element carries out a rotary movement in case of an impact of the motorcycle against an obstacle. It lifts the motorcycle driver, who has been pressed by the impact against the deflection surface, out of his seat and accelerates him upwardly along a circular path. If the centrifugal force becomes too large, the driver will detach from the support element and then flies over the obstacle.

The cross axis must lie below the deflection surface. Only when the cross axis is below the deflection surface will the force introduced by the body of the driver onto the deflection surface be able to produce a torgue in the support element. Similarly, the axis of rotation must be located ahead of the deflection surface. Only when the axis of rotation is ahead of the deflection surface will the deflection surface pivot and enable the lifting of the driver out of the seat.

The support element need not necessarily be a carrier. However, it must be capable in all cases to withstand the impact of the driver. It must not buckle or it otherwise will no longer assure the rotary movement leading to the catapulting effect.

In order to reduce the injury risk of the driver, it is appropriate to pad the deflection surface. As a result thereof, the driver will be softly absorbed when being displaced forwardly. Additionally, it is advantageous to render the deflection surface adjustable in its height. It can thus be adapted to the different body sizes of the individual motorcycle drivers. If a container or carrier is used as the support element, it is appropriate to construct the same two-partite with a bottom part, on which an upper part is pivotally connected. In this manner, the desired height adjustment of the deflection surface can be achieved by a simple pivoting of the upper part. For locking together the two parts in the respective pivot position, for example, detent steps are provided either at the bottom part or at the upper part, into which engages a corresponding counter-member on the other respective part.

In order to preclude during normal driving operation the rotary movement of the support element, it is additionally advantageous to provide a safety latch having an inertia mass, which is supported against a spring. The safety latch engages in a corresponding part fixed at the frame and blocks thereby the rotary movement. In case of an accident, the safety latch moves against the force of the spring out of the fixed part, conditioned by the high deflection forces whch act on its inertia mass, and releases the rotary movement of the support element.

According to a further feature of the present invention, the support element includes laterally projecting formed-out parts which serve as knee protection. However, they may also contribute to influence the flight path.

A further advantage of the present invention resides in that a motorcycle can be refitted according to the present invention without great structural expenditures. Since the rotary movement of the support element is effected by the occurring kinetic forces, no additional propelling means and the supply lines thereof are necessary. If the support element is constructed as a container or carrier, it can be used instead of a tank-mounted carrier with all the advantages which are characteristic thereof.

These and other objects, features and advantages of the present invention will become more apparent from the following description when taken in connection with the accompanying drawing which shows, for purposes of illustration only, one embodiment in accordance with the present invention, and wherein.

Figure 1:
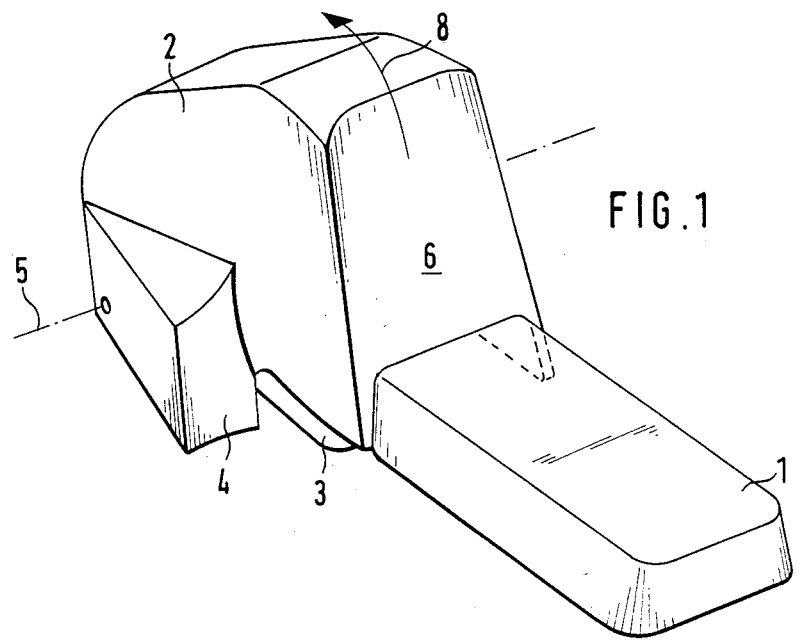
FIG. 1 is a schematic perspective view of that part of a motorcycle which is necessary for an understanding of the present invention.

Referring now to the drawings wherein like reference numerals are used throughout the various views to designate like parts, the parts of a motorcycle illustrated schematically in FIG. 1 include a seat bench 1 and a form-rigid support element 2 arranged in front thereof. The term "in front thereof" is to be understood in the normal driving direction. The support element 2 rests on a fuel tank 3 and includes at its lateral surfaces formedout parts 4 which serve as knee protection for the driver of the motorcycle. Additionally, the support element 2 is rotatably connected at the motorcycle frame (not shown). The axis of rotation is designated by reference numeral 5 and extends essentially horizontally and transversely to the motorcycle longitudinal axis. On its side opposite the axis of rotation 5, the support element 2 includes a deflection surface 6. As can be seen from FIG. 3a, the deflection surface 6 is arranged approximately in front of the upper body of a driver 7. As can be further seen from this figure, the axis of rotation 5 is located below and in front of the deflection surface 6, as viewed in the driving direction. An arrow 8 indicates in FIG. 1 the direction, in which the support element 2 can rotate in case of an impact accident.

Figure 2:
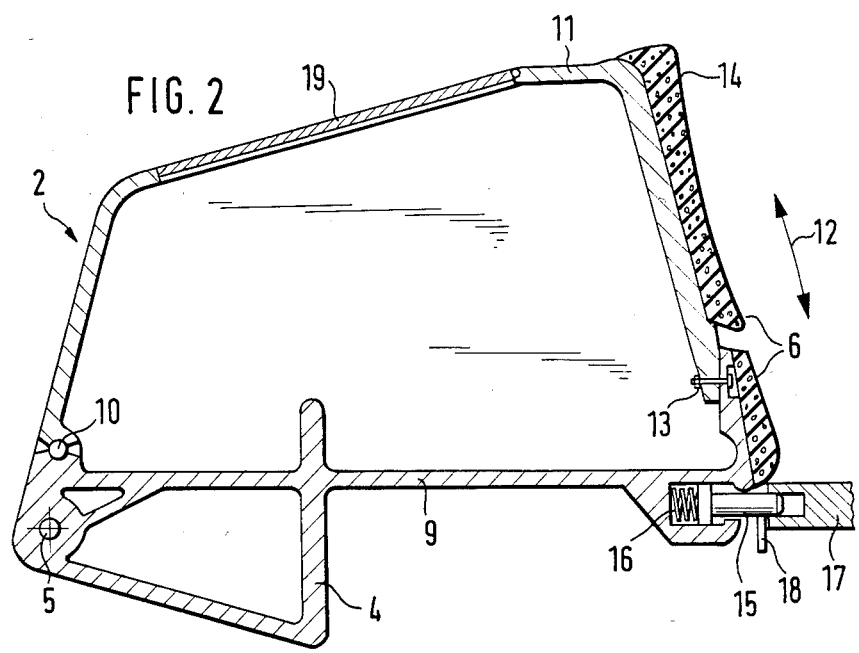
FIG. 2 is a cross-sectional view through a container in accordance with the present invention serving as a tank-mounted carrier.

The support element 2 is constructed in the illustrated embodiment as a container, especially as a tank-mounted carrier. FIG. 2 illustrates the same in longitudinal cross section and shows a bottom part 9, by means of which the container rests on the fuel tank 3. An upper part 11 is pivotally connected to the bottom part 9 by way of a pivot joint 10. Owing to the pivotal connection 10, the deflection surface 6 can be adjusted in its height; a double arrow 12 indicates the adjusting possibility. The bottom part 9 and the upper part 11 can be locked together by detachable fastening means 13 of any known type which are provided at the side of the deflection surface 6 opposite the pivot joint 10. The deflection surface 6 which is composed of partial surfaces on the bottom part 6 and on the upper part 11, is constructed padded as indicated by reference numeral 14.

A safety latch 15 is additionally provided in the bottom part 9, which includes a piston-like part and a shaft. The piston-like part acts as an inertia mass, is seated in a chamber of the bottom part 9 and is supported against a spring 16. The shaft of the safety latch 15 projects out of the chamber and engages in a bore of a fixed frame part 17. By means of a handle 18 projecting from the shaft, the latch can be released by displacement of the latching bolt 15 in the direction toward the spring 16. In case of an impact accident, the latching bolt 15 is automatically displaced in the unlatching direction by the deceleration forces due to its relatively large mass and the support element 2 is then free to pivot about the axis of rotation 5.

The carrier additionally includes at its upper part a flap 19 which permits access into the interior of the carrier. Quite generally, FIG. 2 illustrates a form-stable construction of the carrier which includes also the formed-out parts 4 serving as knee protection.

Figure 3A:
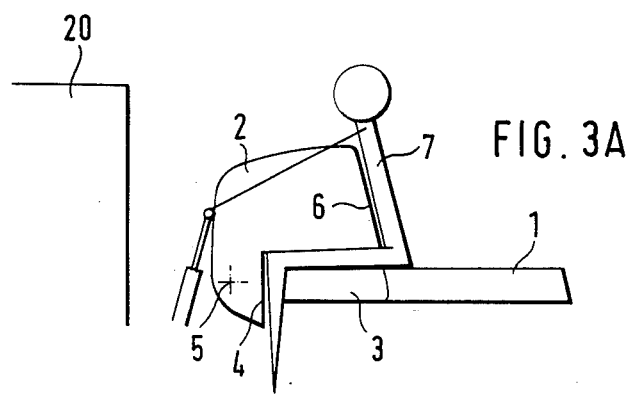
FIGS. 3a-3c are schematic views illustrating successive phases during impact of a motorcycle in accordance with the present invention on an obstacle.
Figure 3B:
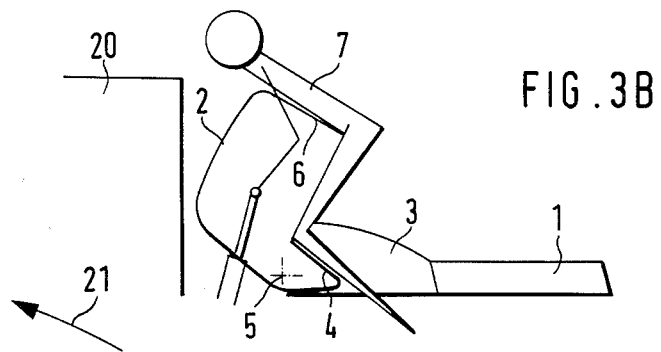
Figure 3C:
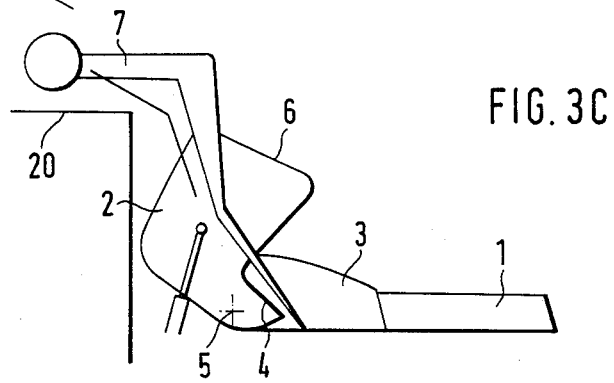

The successive phases of an accident are illustrated in FIGS. 3a through 3c. The motorcycle driver 7 is depicted as driving his motorcycle against an obstacle 20 which is to represent the side wall of a passenger motor vehicle. FIG. 3a illustrates the situation just prior to the impact or at an instant in which the driver 7 has already been displaced forwardly up to the support element 2, i.e. the motorcycle driver is positioned with his upper body against the deflection surface 6. The forces occurring as a result of deceleration due to the impacting of the motorcycle with the motor vehicle causes the release of the latch 15 and rotation of the support element 2 as is illustrated in FIG. 3b. The driver 7 is lifted out of the seat 1 and accelerated upwardly. If this centrifugal force becomes sufficiently large, then the driver 7 slides over the deflection surface 6 and, according to FIG. 3c, flies over the obstacle 20 along a path which is illustrated by the arrow 21.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A single track vehicle comprising a frame, a seat and a deflection surface means arranged generally in front of the upper body of the driver for accelerating the driver upwardly in case of a deceleration conditioned by an accident, characterized in that the deflection surface means is constructed as a form-rigid support element which is pivotal with respect to the frame about a cross axis located below and in front of the deflection surface means.

2. A single track vehicle according to claim 1, characterized in that the support element is constructed as an inherently form-rigid tank-mounted carrier of a motorcycle.

3. A single track vehicle according to claim 2, characterized in that the deflection surface means is padded.

4. A single track vehicle according to claim 3, characterized in that the deflection surface means is adjustable in height.

5. A single track vehicle according to claim 4, characterized in that the carrier is a container having a bottom part and an upper part pivotally secured to the bottom part, the bottom and upper parts being operable to be locked together on the side of the deflection surface means, and the pivot axis for the upper part to the bottom part being disposed opposite the deflection surface means.

6. A single track vehicle according to claim 5, characterized in that the pivot axis between the bottom part and the upper part is located generally in the same area as the cross axis of the deflection surface means.

7. A single track vehicle according to claim 5, characterized in that the bottom part includes a spring-loaded safety latch provided with an inertia mass which is adapted to engage in a fixed frame part of the motorcycle.

8. A single track vehicle according to claim 7, characterized in that the support element includes laterally projecting formed-out portions serving as knee protection.

9. A single track vehicle according to claim 1, characterized in that the deflection surface means is adjustable in height.

10. A single track vehicle according to claim 1, characterized in that the support element is formed as a container having a bottom part and an upper part pivotally secured to the bottom part, the bottom and upper parts being operable to be locked together on the side of the deflection surface means, and the pivot axis for the upper part to the bottom part being disposed opposite the deflection surface means.

11. A single track vehicle according to claim 10, characterized in that the pivot axis between the bottom part and the upper part is located generally in the same area as the cross axis of the deflection surface means.

12. A single track vehicle according to claim 10, characterized in that the support element includes a spring-loaded safety latch provided with an inertia mass which is adapted to engage in a fixed frame part of the motorcycle.

13. A single track vehicle according to claim 1, characterized in that the support element includes laterally projecting formed-out portions serving as knee protection.

14. A single track vehicle according to claim 1, characterized in that the support element includes a spring-loaded safety latch provided with an inertia mass which is adapted to engage in a fixed frame part of the motorcycle.

15. A single track vehicle according to claim 1, characterized in that the deflection surface means is padded.

16. A safety arrangement for a single track vehicle having a frame and a seat, the arrangement comprising deflection surface means formed as part of a form rigid support element pivoted relative to the vehicle frame and disposed generally in front of the upper body of a driver of the vehicle, said support element being pivoted about a transverse axis disposed generally forwardly of the deflection surface means in the direction of travel of the vehicle, wherein deceleration conditioned by the vehicle impacting an object results in the driver engaging the deflection surface means and being moved upwardly away from the vehicle by the support element pivoting about the transverse axis.

17. A safety arrangement as set forth in claim 16, wherein a spring-loaded safety latch having an inertia mass for actuation is operatively associated with the support element and the frame of the vehicle.

18. A safety arrangement as set forth in claim 16, wherein the support element is constructed as a container.

19. A safety arrangement as set forth in claim 18, wherein the container includes an upper part pivotally connected to a bottom part and fastening means for adjustably securing the upper part to the bottom part.

20. A safety arrangement as set forth in claim 16, wherein the transverse axis is disposed forwardly and below the deflection surface means in the direction of travel of the vehicle wherein the support element is freely pivotable about the transverse axis upon the impacting of the vehicle with an object to move the driver of the vehicle engaged with the deflection surface means upwardly away from the vehicle.

* * * * *